(12) United States Patent
Farinacci et al.

(10) Patent No.: US 9,998,528 B2
(45) Date of Patent: Jun. 12, 2018

(54) DIRECT ACCESS STORAGE DEVICE ANALYZER

(71) Applicant: INTERNATIONAL BUSINESS MACHINES CORPORATION, Armonk, NY (US)

(72) Inventors: Jesse L. Farinacci, Buffalo, NY (US); Marc A. Martin, Secaucus, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 15/045,675

(22) Filed: Feb. 17, 2016

(65) Prior Publication Data

US 2017/0237809 A1  Aug. 17, 2017

(51) Int. Cl.
*G06F 9/46* (2006.01)
*H04L 29/08* (2006.01)
*G06F 3/06* (2006.01)
*G06F 9/50* (2006.01)

(52) U.S. Cl.
CPC ........ *H04L 67/1008* (2013.01); *G06F 3/0604* (2013.01); *G06F 3/067* (2013.01); *G06F 3/0653* (2013.01); *G06F 3/0689* (2013.01); *G06F 9/5016* (2013.01); *G06F 9/5083* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,012,032 A | 1/2000 | Donovan et al. | |
| 7,260,113 B2 * | 8/2007 | Lynn | G06F 3/0613 370/230.1 |
| 7,873,808 B2 | 1/2011 | Stewart | |

(Continued)

FOREIGN PATENT DOCUMENTS

EP   1489510 A2   12/2004

OTHER PUBLICATIONS

David West; Highly Available Virtual Machines with IBM Storwize V7000 and Microsoft Hyper-V; Configuration and Best Practices Guide; See p. 6; Oct. 2010.

(Continued)

*Primary Examiner* — Gregory A Kessler
(74) *Attorney, Agent, or Firm* — Cantor Colburn LLP; William A. Kinnaman, Jr.

(57) ABSTRACT

Technical solutions are described for selecting a server for executing a task. An example method includes determining a plurality of storage volumes corresponding to each respective server from a plurality of servers. The computer implemented method also includes determining a reachability score of a first storage volume from the plurality of storage volumes, where the first storage volume is associated with a first server, and where the reachability score is based on a number of connectivity channels associated with the first storage volume. The computer implemented method also includes selecting the first server that is associated with the first storage volume for execution of the task. In an example, the computer implemented method may communicate the reachability score to a user device and receive the selection of the first server in response.

20 Claims, 6 Drawing Sheets

(56) References Cited

U.S. PATENT DOCUMENTS

| | | |
|---|---|---|
| 8,321,554 B2 * | 11/2012 | Dickinson .................. G06F 8/61 |
| | | 709/220 |
| 2009/0100163 A1 * | 4/2009 | Tsao ........................ H04L 41/12 |
| | | 709/223 |
| 2009/0281983 A1 | 11/2009 | Cowden et al. |
| 2010/0023725 A1 | 1/2010 | Huber et al. |
| 2011/0167302 A1 | 7/2011 | McCune et al. |
| 2013/0007361 A1 | 1/2013 | Peake et al. |
| 2013/0282998 A1 | 10/2013 | Tatsumi et al. |

OTHER PUBLICATIONS

Hitachi; Hitachi Virtual Storage Platform; Hitachi True Copy for Mainframe User Guide; See section 3-20 (2010-2013).

Web Interface User's Guide for the ESS Specialist and ESS Copy Services (see pp. 121-122); Third Edition (Dec. 2000).

\* cited by examiner

DIRECT ACCESS STORAGE DEVICE ANALYZER

BACKGROUND

The present application relates to computer technology, and more specifically, to selection of a server to execute a task by a client device.

Client-server architecture (client/server) is a network architecture in which clients rely on servers for resources, such as files, devices, and even processing power. Typically, a client computer transfers a task for execution by a server, such as in a case where the task is so resource intensive that the client computer is not able to execute the task. With the advent of cloud computing, reliance on servers, such as mainframes, that execute computationally expensive tasks and provide the results to the client devices, has increased. Accordingly, a measure to determine a quality of the server is an availability of the server. For example, customers, such as hospitals and data centers demand high availability of the servers that perform even routine daily activities. The availability refers to the ability of users to obtain a service or good, access the system, whether to submit new tasks, update or alter existing tasks, or collect the results of previous tasks. Generally, the term downtime is used to refer to periods when a system is unavailable.

SUMMARY

According to an embodiment, a computer implemented method for selecting a server for executing a task includes determining a plurality of storage volumes corresponding to each respective server from a plurality of servers. The computer implemented method also includes determining a reachability score of a first storage volume from the plurality of storage volumes, where the first storage volume is associated with a first server, and where the reachability score is based on a number of connectivity channels associated with the first storage volume. The computer implemented method also includes selecting the first server that is associated with the first storage volume for execution of the task. In an example, the computer implemented method may communicate the reachability score to a user device and receive the selection of the first server in response.

According to an embodiment, a system for selecting a server for executing a task includes a memory and a processor. The processor determines a plurality of storage volumes corresponding to each respective server from a plurality of servers. The processor also determines a reachability score of a first storage volume from the plurality of storage volumes, where the first storage volume is associated with a first server, and where the reachability score is based on a number of connectivity channels associated with the first storage volume. The processor selects the first server that is associated with the first storage volume for execution of the task. In an example, the processor communicates, to a user device, the reachability score of the first storage volume, and in response, receives, from the user device, a selection of the first server for execution of the task that the user device initiates.

According to an embodiment, a computer program product for selecting a server for executing a task includes a computer readable storage medium. The computer readable storage medium includes computer executable instructions to determine a plurality of storage volumes corresponding to each respective server from a plurality of servers. The computer readable storage medium also includes computer executable instructions to determine a reachability score of a first storage volume from the plurality of storage volumes, where the first storage volume is associated with a first server, and where the reachability score is based on a number of connectivity channels associated with the first storage volume. The computer readable storage medium also includes computer executable instructions to select the first server that is associated with the first storage volume for execution of the task. Alternatively or in addition, the computer readable storage medium includes instructions to communicate, to a user device, the reachability score of the first storage volume and, in response, receive, from the user device, a selection of the first server for execution of the task that the user device initiates.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
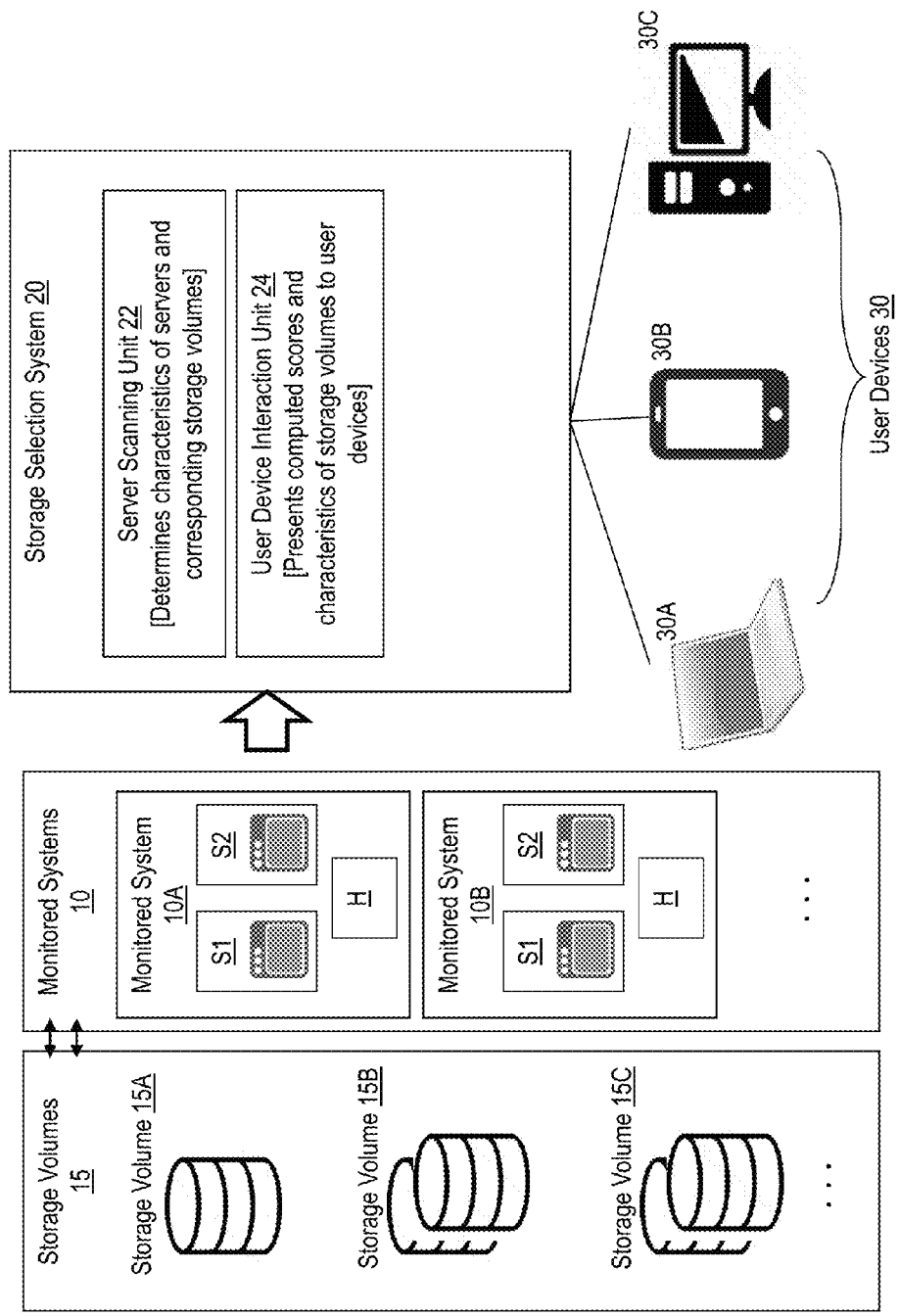
FIG. 1 illustrates a storage selection system in accordance with an embodiment.

A server computer, such as a mainframe like IBM SYSTEM Z™ have very little downtime. As data management products have increasingly integrated, a demand for optimization across clusters and datacenters has increased. A cluster such as a PARALLEL SYSPLEX™ is a group of mainframes acting together as a single system image with an operating system, such as Z/OS™. In an example, a cluster may be used for disaster recovery, and combines data sharing and parallel computing to allow multiple mainframes in the cluster to share a task (or a workload) for high performance and high availability. The cluster or each mainframe in the cluster may use a storage volume to store data associated with the task that the mainframe(s) are executing. The storage volume may include one or more storage devices that are configured to act as a single storage volume. For example, the storage volume may be implemented as a direct access storage device (DASD). The storage volume may include multiple storage disks that are configured, such as using a type of redundant array of independent disks (RAID) scheme. For example, the storage devices may be in RAID-1, RAID-2, RAID-5, or any other RAID scheme, to enhance redundancy and resistance to data loss.

In addition, the cluster may include a hardware management console (HMC) that manages the distribution of tasks across the servers in a cluster. In an example, the HMC may be responsible to manage more than one cluster. Thus, for example, the HMC may manage two clusters, four clusters, or any other number of clusters, each including one or more servers. In an example, a server may be associated with a respective storage volume. In another example, servers in a cluster may be associated with a single storage volume, in other words, the storage volume serves all the servers in the cluster. Further, a storage volume may be shared among one or more clusters. Accordingly, availability of the storage volume may affect availability of the server and/or cluster accessing the storage volume. Further yet, a reachability of the storage volume may determine whether or not the storage volume, and in turn a server and/or a cluster that uses the storage volume, is a suitable candidate to execute a task.

The technical solutions, by using attributes of the storage volumes, facilitate user to determine the storage volumes that are shared amongst clusters as well as a utilization of the storage volumes. The technical solutions further facilitate creating an optimal redundancy pairing by using real-time data to compute and assign scores for the storage volumes. The technical solutions, for example, communicate the scores for the storage volumes to users for selection of the corresponding servers for execution of task(s). Further yet, the scores of the storage volumes may be used to further compute and assign scores for the servers and/or clusters.

In addition, the technical solutions facilitate an encapsulation of the DASD information from across different types of servers and/or clusters and assigning a score to the servers/clusters based on the encapsulated information. The technical solutions may organize the encapsulated information and facilitate users to browse and search the data, such as using schematics of web fronts or cloud services like Java EE server.

Thus, the technical solutions create and present multiple views of the storage volumes within accessible hardware configurations. For example, the technical solutions facilitate accessing information from central processor complex (CPC) images and the I/O definitions of the servers/clusters, which may be of different types. The technical solutions, based on the accessed information, compute a reachability and reliability scores of the storage volumes used by the servers/clusters. The technical solutions may further assign scores to the servers/clusters based on the reachability and reliability scores of the corresponding storage volumes. The technical solutions may further encapsulate the accessed data in an organized manner, such as using a predetermined schema for facilitating the data to be queried and used by other devices. The technical solutions further facilitate communicating the scores and other data to user devices for selection of a server/cluster for execution of a task, to provide an optimal redundancy solution for the customers' needs. For example, given the information about shared access of a particular storage volume, and the usage of the storage volume, the customer may get a better understanding of whether the storage volume is a good fit for the task at hand. For example, based on the information received, the customer may determine which advanced copy services relation to use or other services on offer. Thus, by not having the customer to predetermine usage goals, the technical solutions facilitate the user to try different solutions that may be better than an originally decided solution, such as selection of a server/cluster for executing a task.

Further yet, the technical solutions may identify, to the users, a set of clusters/servers that can access a specific storage volume. The user, based on the information, may select one of the server/cluster from the set, based on the user's accessibility to one or more of the servers/clusters from the set. For example, the user may have access to storage volumes SV-1 and SV-2 from office and storage volumes SV-2 and SV-3 from home. Further, cluster-1, server-2 have access to SV-1, and server-2 and cluster-3 have access to SV-2, and only cluster-3 has access to SV-3. In this case, if the user is planning to initiate execution of a task from office and see the results from home, the user may desire to use server/cluster that has access to SV-2, which the user can access from both locations. Of course, other examples may have different configurations than the one described here. In addition to facilitating the user to select the server/cluster to be use in the above scenario, the technical solutions facilitate the user to select a server/cluster for executing the task based on additional attributes of the storage volume, which may affect redundancy and resistance to data loss.

FIG. 1 illustrates a storage selection system 20 that facilitates user devices 30 to select a monitored system from one or more monitored systems 10 for execution of a task based on attributes of storage volumes 15 that are accessible by the monitored systems 10. For example, the storage selection system 20 facilitates a first user device 30A to select a monitored system 10A for execution of task. The storage selection system 20 facilitates the selection by assigning scores to the monitored systems 10 and communicating the scores to the user devices 30. The storage selection system 20 assigns the scores based on the storage volumes 15 that the monitored system 10 have access to. For example, the monitored system may access one or more of the storage volumes 15. Of course, there may be fewer or more monitored systems and storage volumes than those illustrated.

The monitored systems 10 may include one or more computer systems 10A, 10B. Of course, there may be more or fewer monitored systems 10 than those illustrated in FIG. 1. A monitored system from the monitored systems 10 may be any computer system, such as a server computer, a mainframe computer, a cluster of server computers, or any other type of computer system. The monitored systems 10 may include computer systems of the same type, such as same manufacturer, same model, same components, and so on. In other examples, the monitored systems 10 may include different types of computer systems. For example, the first monitored system 10A may be an IBM SYSPLEX™ cluster computer including one or more SYSTEM Z™ servers, and a second monitored system 10B may be a cluster of HP SUPERDOME™ servers. For example, the each monitored system may be a cluster that includes servers (for example, S1 and S2) and a hardware management console (H). Of course, different monitored systems may include different number of servers. Further, two or more of the monitored systems 10 may share an HMC, or in other words, an HMC may manage two or more of the monitored systems 10. Further, the first monitored system 10A may operate an operating system, such as Z/OS™ that is different from an operating system of the second monitored system 10B, such as LINUX™. Of course, the monitored systems 10 may include other types of servers than those listed herein, and/or different operating systems than those listed herein.

The storage selection system 20 further monitors storage volumes 15. Each of the monitored systems 10 may access one or more of the storage volumes 15. For example, the first monitored system 10A and the second monitored system 10B may access the storage volumes 15 for executing a task. For example, the storage volumes 15 store data that the monitored systems 10 use to execute the task, as well as intermediate and/or final results of executing the task. A storage volume from the storage volumes 15, such as a first storage volume 15A may be a physical storage device, such as a tape drive, a solid-state drive, a hard disk drive, or a combination thereof. In another example, the first storage volume 15A may be a logical drive that is backed by one or more physical storage devices. For example, a second storage volume 15B may present itself as a single device, but may actually be backed by more, such as three, or five, storage devices. The physical storage devices that back the logical storage volume 15B may be configured for redundancy and mitigate chances of data loss. For example, the storage devices may be configured as in a RAID scheme, such as RAID-1, RAID-2, RAID-5, or any other redundancy scheme. In another example, the first storage volume 15A may be a logical volume that is backed by four solid-state devices, the storage volume 15B may be a logical volume backed by a single physical storage device, and a storage volume 15C may be another logical volume that is backed by tape drives. Thus, the storage volumes 15 may include one or more storage volumes that are configured different from each other.

In an example, the first storage volume 15A may be accessible by a single monitored system, such as the second monitored system 10B, and the first storage volume 15A may be accessible by both, the first monitored system 10A and the second monitored system 10B. Of course, any other configuration of accessibility is possible in other examples.

The user devices 30 may include one or more communication apparatus that facilitate the users to initiate execution of a task via one or more of the monitored systems 10. The user devices 30 may be of the same type or of different types. For example, the user devices 30 may include a communication apparatus such as a desktop computer, a laptop computer, a phone, a tablet computer, or any other communication apparatus that facilitates the user to communicate with the storage selection system 20, or any other system via a communication network, such as a wired or a wireless communication network. The storage selection system 20 may receive different requests from a first user device 30A, a second user device 30B, and a third used device 30C, and provide different results to the respective user devices 30 based on the corresponding requests.

The storage selection system 20, among other components, includes a server scanning unit 22, and a user device interaction unit 24. The components may be hardware or a combination of hardware and software. For example, the components may be electronic circuitry, such as application specific integrated circuits (ASICs), field programmable gate arrays (FPGAs), processors, or any other types of hardware controlled by computer executable instructions or logic. In addition, or alternatively, the components may include computer readable memory that includes computer executable instructions.

Figure 2:
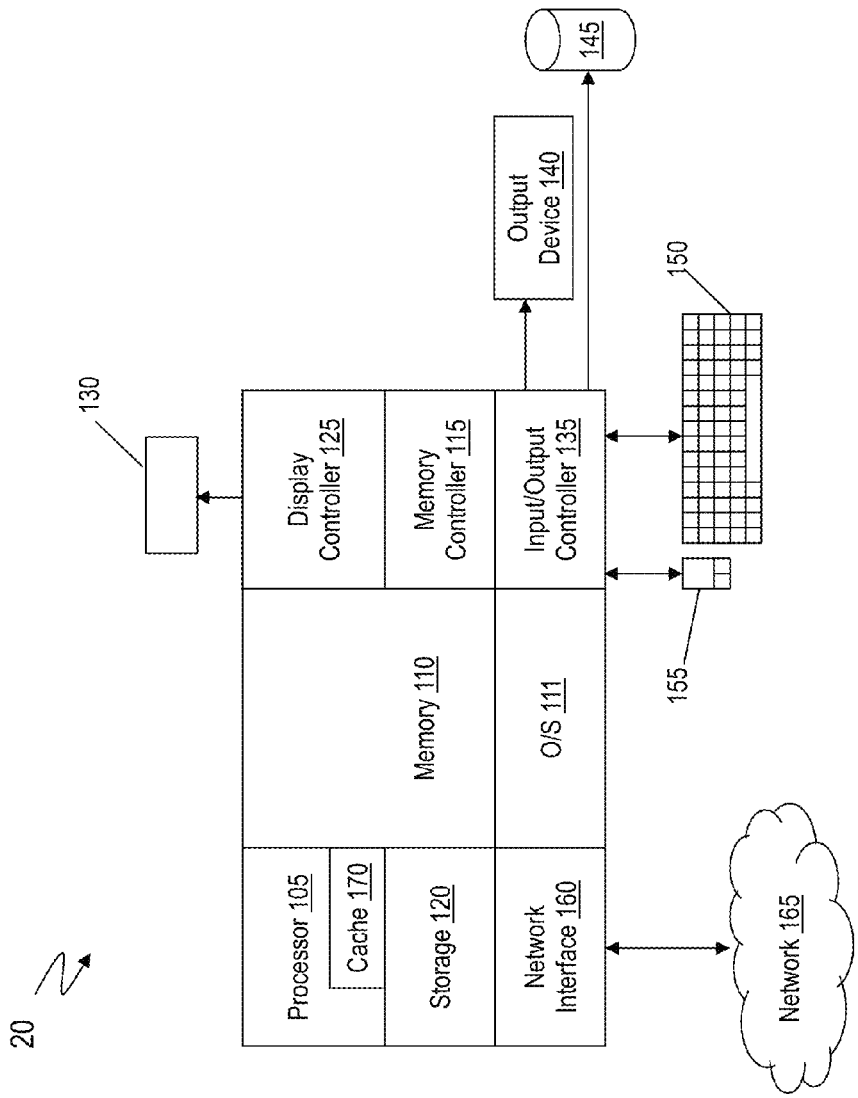
FIG. 2 illustrates example components of the storage selection system in accordance with an embodiment.

FIG. 2 illustrates example components of the storage selection system 20. In an example, the storage selection system 20 may be a communication apparatus, such as a computer. For example, the storage selection system 20 may be a server computer, or any other device that communicates via a network 165. The storage selection system 20 includes hardware, such as electronic circuitry. The server scanning unit 22 and the user device interaction unit 24 may be implemented using the hardware and/or software components illustrated in FIG. 2.

The storage selection system 20 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter, accelerometer, global positioning signal receiver), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the storage selection system 20, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The storage selection system 20 may further include a display controller 125 coupled to a user interface or display 130. In some embodiments, the display 130 may be an LCD screen. In other embodiments, the display 130 may include a plurality of LED status lights. In some embodiments, the storage selection system 20 may further include a network interface 160 for coupling to a network 165. The network 165 may be an IP-based network for communication between the storage selection system 20 and an external server, client and the like via a broadband connection. In an embodiment, the network 165 may be a satellite network. The network 165 transmits and receives data between the storage selection system 20 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
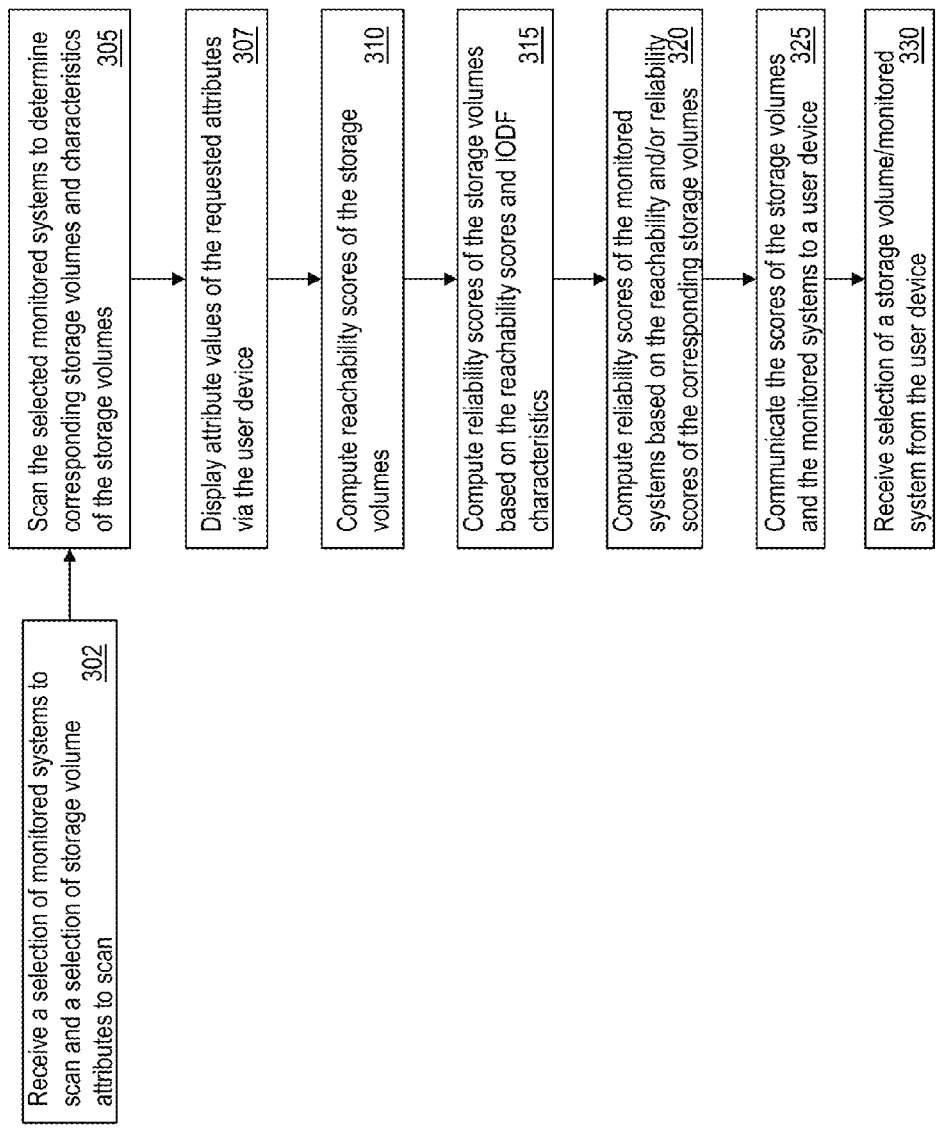
FIG. 3 illustrates a flowchart of an example method for facilitating a user device to select a monitored system for execution of a task in accordance with an embodiment.
Figure 4:
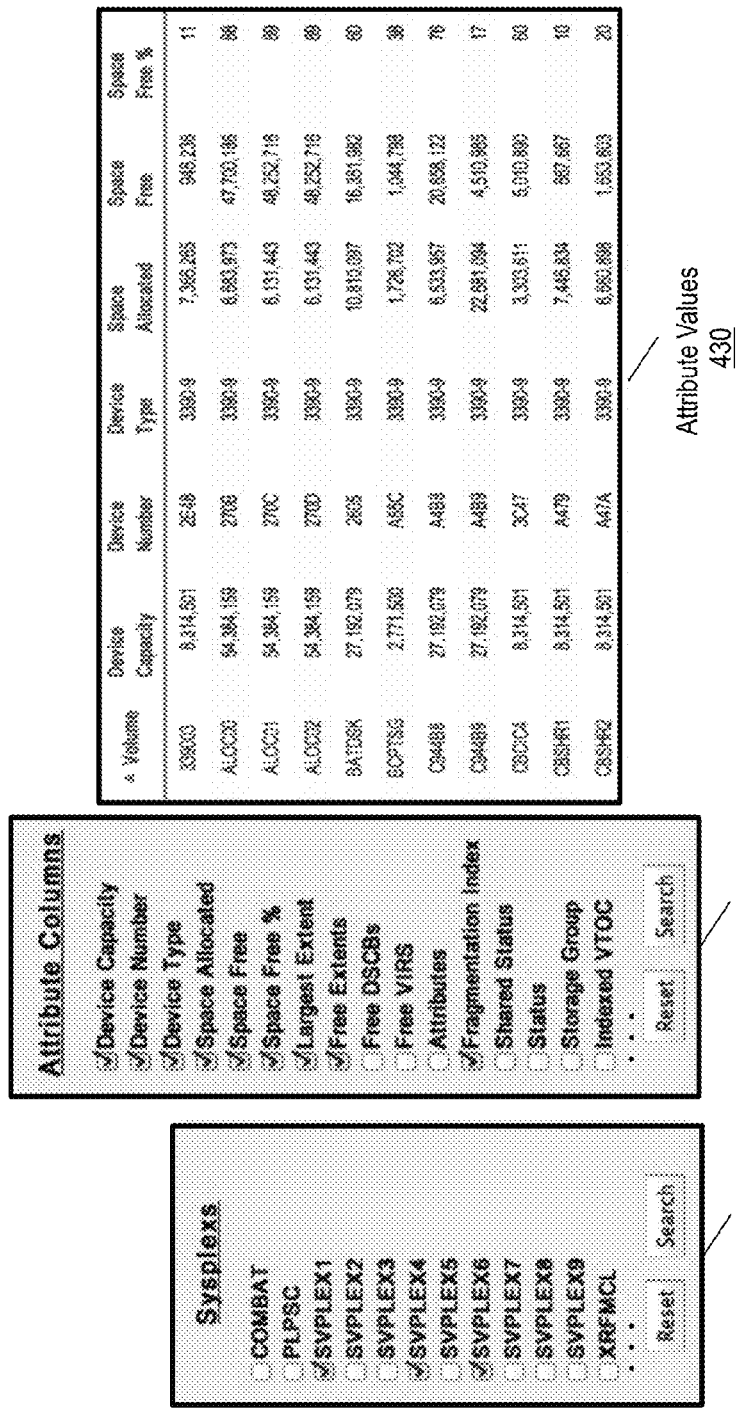
FIG. 4 illustrates elements that an example storage selection system displays at a user device to facilitate selection of a monitored system by in accordance with an embodiment.

FIG. 3 illustrates a flowchart of an example method for the first user device 30A to select the first monitored system 10A for execution of a task according to the technical solutions described herein. FIG. 4 illustrates the elements described in FIG. 3, which are displayed at the first user device 30A by the storage selection system 20. For example, the storage selection system 20 receives a selection of monitored systems 405 to scan and a selection of storage volume attributes 415 to identify, as shown at block 302. The storage selection system 20 scans the monitored systems 10 to determine storage volumes attributes of the storage volumes associated with the monitored systems, as shown at block 305. The storage selection system 20 identifies the values of the requested attributes by querying the monitored systems 10, for example accessing input/output definition files (IODF) of the monitored systems 10. The storage selection system 20 displays values of the attributes requested by the first user device 30A, as shown at block 307.

For example, as shown in FIG. 4, the first user device 30A may select a subset of the monitored systems 405 to scan. For example, the storage selection system 20 displays a list of monitored systems 10 to the user via the first user device 30A. The user may select the subset of the monitored systems 405 from the list. The first user device 30A may further select a subset of requested attributes 415 to evaluate. The requested attributes 415 may include a device capacity, a device number (or address), a device type, a space allocated, an amount of free storage space, a fragmentation index, a shared status, and other such attributes or a combination thereof. In an example, the storage selection system 20 displays a list of attributes values from which the first user device 30A selects the requested attributes 415. In response, the storage selection system 20 displays to the user, via the first user device 30A, the attributes values 430 for the storage volumes associated with the selected subset of monitored systems 405. The user may select the storage volume for the execution of a task based on the displayed attribute values 430. In turn, the user selects a monitored system that has access to the selected storage volume for executing the task. In an example, the storage selection system 20 receives the selection of the monitored system and/or the storage volume for executing the task, as shown at block 330.

In an example, the displayed attribute values 430 may be inconclusive and the first user device 30A may demand additional metrics to select the storage volume, and in turn, the monitored system suited for executing the task. Accordingly, the storage selection system 20 computes and assigns scores to the storage volumes and monitored systems and communicates the scores to the first user device 30A to facilitate the first user device 30A to make the selection. For example, the storage selection system 20 computes reachability scores of the storage volumes associated with the subset of monitored systems 405, as shown at block 310. The reachability score of a storage volume may take into account a number of points of connectivity, or channels that facilitate access of the storage volume. In addition, the reachability score may take into account reliability of the channels.

Figure 5:
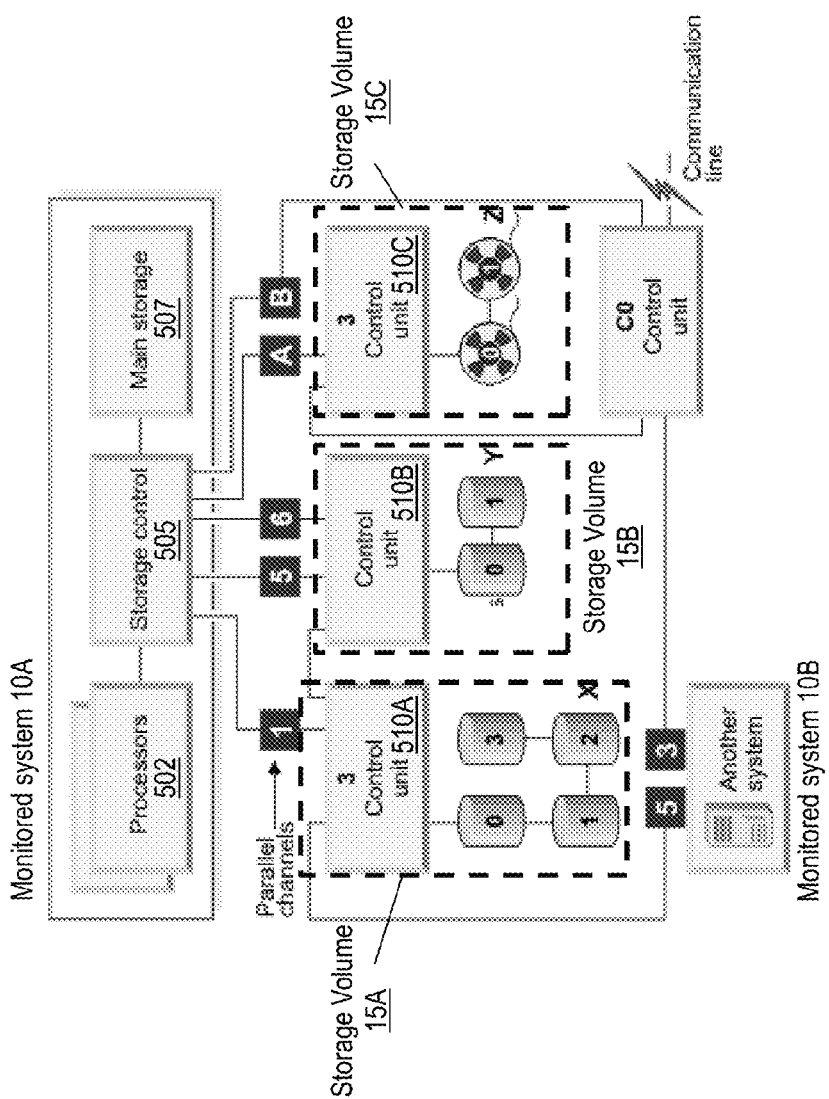
FIG. 5 illustrates a conceptual diagram of connectivity between monitored systems and storage volumes in accordance with an embodiment.

FIG. 5 illustrates a conceptual diagram of connectivity between the monitored systems 10 and the storage volumes 15. The monitored system 10A contains processors 502, a memory 507, and storage control circuits 505, which include interfaces for channels. A channel provides an independent data and control path between I/O devices and memory of the monitored system 10A. Each of the storage volumes 15 may have any number of channels, such as 16 channels, 32 channels, or over 1000 channels. Channels connect to a control unit of a storage volume. For example, the storage volumes 15A, 15B, and 15C, each may include respective control units 510A, 510B, and 510C. The control unit 510A contains logic to work with a particular type of I/O device. For example, a control unit for a printer has different internal circuitry and logic than a control unit for a tape drive. In an example, the control unit 510A may support multiple channel connections providing multiple paths to the control unit 510A and corresponding storage devices of the first storage volume 15A.

The storage control unit 505 connects to the storage volumes 15 and corresponding storage devices, such as disk drives, tape drives, and so forth, via communication interfaces and the respective control units 510A, 510B, and 510C. The channels illustrated may be parallel channels (also known as bus and tag channels, named for the two heavy copper cables they use), ESCON® channels (Enterprise Systems CONnection), FICON® (Fiber CONnection) channels, or a combination thereof. Each channel, control unit 510A-C, and storage device has an address, which, for example, may be expressed as a hexadecimal number. For example, the disk drive marked with an X in FIG. 5 may have an address 132—the first digit is the channel number, the second digit is the control unit number, the last digit is the device number. The disk drive marked with a Y in FIG. 5 can be addressed as 171, 571, or 671 because it is connected through three channels. By convention, the device is known by its lowest address (171), but all three addresses could be used by the monitored systems to access the disk drive. Multiple paths to a device are useful for performance and for availability. For example, when the first monitored system 10A that is executing the task submitted by the first user devices 30A is attempting to access disk 171, the monitored system 10A may first try channel 1. If the channel 1 is busy (or not available), the monitored system 10A tries channel 5, and so forth.

FIG. 5, further illustrates that the second monitored system 10B with two channels connected to the control units 510A and 510C that are also used by the first monitored system 10A. Thus, the monitored systems 10A and 10B share the storage devices of the storage volumes 15A and 15C. For example, the tape drive Z of the storage volume 15C may be addressed as A31 by the first monitored system 10A, but is addressed as 331 by the second monitored system 10B. The monitored systems 10, and or the control units of the storage volumes 15 may be equipped with hardware and software techniques to control exposures such as updating the same disk data at the same time from two independent systems.

Figure 6:
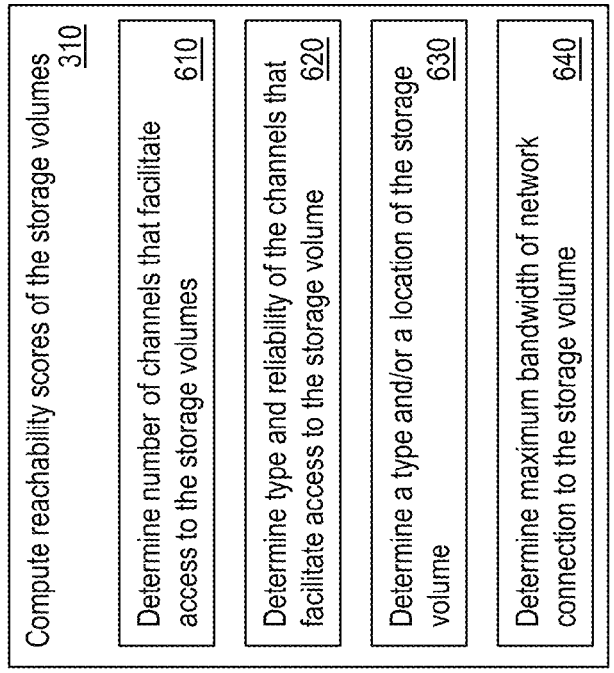
FIG. 6 illustrates a flowchart of determining the reachability score of a storage volume in accordance with an embodiment.

FIG. 6 illustrates a flowchart of determining the reachability score of a storage volume. The storage selection system 20 identifies a number of channels for each of the storage volumes associated with the selected subset of monitored systems 405, as shown at block 610. For example, in case of the first storage volume 15A, the storage selection system 20 accesses the IODF configuration of the each of the monitored systems 10 (or the subset of monitored systems 405) to identify a number of monitored systems that the first storage volume 15A. Alternatively, the storage selection system 20 accesses information from the control unit 510A of the first storage volume 15A for determining a number of channels that facilitate access to the first storage volume 15A. The number of channels that facilitate access to the first storage volume 15A may be the reachability score of the first storage volume 15A, in an example. Further yet, the reachability score may be based on a reliability of the channels that facilitate access to the first storage volume 15A, as shown at block 620. For example, the storage selection system 20 identifies the types of the different channels, such as a parallel channel, an ESCON® channel, a FICON® channel, or any other type of channel. The storage selection system 20 may use predetermined reliability scores assigned to the different types of the channels to scale the reachability score of the first storage volume 15A. In an example, an average of the predetermined reliability scores may be used as a scaling factor to scale the number of channels (such as by computing a product) to determine the reachability score.

Alternatively, the reachability score of the first storage volume 15A may further be based on a type of the first storage volume, such as the type of storage devices used by the first storage volume, as shown at block 630. For example, the different types of storage devices may be assigned predetermined reliability scores. The reachability score of the storage volume may be scaled using a statistics, such as a mean, of the predetermined reliability scores of the types of the storage devices.

Alternatively or in addition, the reachability score may be based further on a location of the first storage volume 15A, as shown at block 630. For example, based on the location of the storage volume, the storage selection system 20 may determine a distance of the storage volume from the monitored systems 10. A statistic, such as a mean, of the distances, may be used to scale the reachability factor. For example, the distance may indicate a time taken to communicate data to and from the storage volume.

Further yet, the storage selection system 20 determines a maximum bandwidth of the network connection to the first storage volume 15A, as shown at block 640. The reachability score of the first storage volume 15A may be further scaled based on the maximum bandwidth. For example, the storage selection system 20 may scale the reachability score by a predetermined factor based on the network bandwidth being in a predetermined range. For example, the network bandwidth in the 0-100 MBps range may equate to a scaling factor of 1, the network bandwidth in the range 101 MBps-1 GBps may equate to a scaling factor of 1.5, and so on. Of course, different scaling factors and ranges may be used in different examples.

The storage selection system 20 may communicate the reachability scores of the storage volumes 15 to the first user device 30A that requests the scores, as shown at block 325. The first user device 30A may select the first storage volume 15A, and in turn the first monitored system 10A that access the first storage volume 15A to execute the task based on the values of the reachability scores. In an example, if the reachability score of any of the storage volumes is below a predetermined threshold value, the storage selection system 20 may notify the first user device 30A, such as by highlighting that storage volume, or in any other manner. The storage selection system 20 may receive the selection of the first storage volume from the first user device 30A, as shown at block 330.

In an example, the storage selection system 20, based on the reachability scores, may compute reliability scores of the storage volumes 15, as shown at block 315. For example, the reliability of the storage volumes may further take in to account the attributes that the storage selection system 20 accessed using the IODF data of the monitored systems 10. For example, the reliability score of the first storage volume 15A may be computed by scaling the reachability score of the first storage volume 15A according to the values of the IODF attributes. For example, the type of configuration, RAID-1, RAID-2, and the like may be assigned predetermined reliability scores. The reachability score of the first storage volume 15A may be scaled using the predetermined reliability scores assigned to the configurations based on the configuration that the first storage volume 15A uses. In another example, values of attributes, such as a percentage of free space, a large extent, a fragmentation index, or a combination thereof may be used as scaling factors to compute the reliability score of the first storage volume 15A.

The storage selection system 20 may communicate the reliability scores of the storage volumes 15 to the first user device 30A that requests the scores, as shown at block 325. The first user device 30A may select the first storage volume 15A, and in turn the first monitored system 10A that access the first storage volume 15A to execute the task based on the values of the reliability scores. In an example, if the reliability score of any of the storage volumes is below a predetermined threshold value, the storage selection system 20 may notify the first user device 30A, such as by highlighting that storage volume, or in any other manner. The storage selection system 20 may receive the selection of the first storage volume from the first user device 30A, as shown at block 330.

In an example, the storage selection system 20, based on the reachability scores, may compute reliability scores of the monitored systems 10, as shown at block 320. For example, the reachability and/or the reliability scores of the storage volumes 15 may be used as scaling factors to scale predetermined reliability scores of the monitored systems 10. For example, the storage selection system 20 may assign predetermined reliability scores to the monitored system based on the type of the monitored systems. For example, the first monitored system 10A may be assigned a predetermined reliability score of 25 and the second monitored system 10B may be assigned a predetermined reliability score of 100, based on a number of HMCs that can access the respective monitored systems. For example, the larger the number of HMCs that can access a monitored system, the larger the predetermined reliability score of the monitored system will be. The predetermined reliability score may further be based on aspects such as, a manufacturer, a model number, a version, a type, an operating system type, and the like or a combination thereof. The predetermined reliability score of the first monitored system 10A may be further scaled according to the reachability and/or the reliability scores of the storage volumes 15 that the first monitored system 10A accesses.

The storage selection system 20 may communicate the reliability scores of the monitored systems 10 to the first user device 30A that requests the scores, as shown at block 325. The first user device 30A may select the first monitored system 10A to execute the task based on the values of the reliability scores. In an example, if the reliability score of any of the monitored systems 10 is below a predetermined threshold value, the storage selection system 20 may notify the first user device 30A, such as by highlighting that monitored system, or in any other manner. The storage selection system 20 may receive the selection of the monitored systems 10 from the first user device 30A, as shown at block 330.

Accordingly, the technical solutions facilitate an encapsulation of the DASD information from across different types of servers and/or clusters and assigning a score to the servers/clusters based on the encapsulated information. The technical solutions facilitate presenting the scores and/or the encapsulated information to users for selection of servers/clusters to execute a task accordingly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for selecting a server for executing a task, the method comprising:
    determining a plurality of storage volumes corresponding to respective servers from a plurality of servers;
    determining a reachability score of a first storage volume from the plurality of storage volumes, wherein the first storage volume is associated with a first server, and wherein the reachability score is indicative of a predetermined reliability, wherein the reachability score is further based on a channel type such that the reachability score assigned to the first volume is based on an average of reachability scores assigned to each of the different types of connectivity channels other than the first volume; and
    selecting the first server that is associated with the first storage volume for execution of the task.

2. The computer implemented method of claim 1, wherein the reachability score of the first storage volume is further based on reliability scores of each connectivity channel from the connectivity channels associated with the first storage volume.

3. The computer implemented method of claim 1, wherein each connectivity channel from the connectivity channels associated with the first storage volume identifies a separate way to access the first storage volume.

4. The computer implemented method of claim 1, wherein the reachability score of the first storage volume is further based on a reachability score of the first server, wherein the reachability score of the first server is based on a number of hardware management consoles that have access to the first server.

5. The computer implemented method of claim 1, wherein the reachability score is a first reachability score, the method further comprising:
    determining a second reachability score of a second storage volume from the plurality of storage volumes, wherein the second storage volume is associated with a second server;
    communicating the second reachability score of the second storage volume; and
    in response to the first reachability score being higher than the second reachability score, receiving the selection of the first server that is associated with the first storage volume for execution of the task.

6. The computer implemented method of claim 1, further comprising:
    receiving a predetermined reachability threshold value; and
    in response to the reachability score of the first storage volume being lower than the predetermined reachability threshold value, notifying a user.

7. The computer implemented method of claim 1, further comprising:
    determining a reliability score of the first storage volume based on the reachability score of the first storage volume and a storage-configuration score of the first storage volume, wherein the storage-configuration score is based on a type of configuration used by the first storage volume;
    communicating the reliability score of the first storage volume to a user; and
    receiving the selection of the first server for execution of the task.

8. The computer implemented method of claim 7, wherein the type of configuration used by the first storage volume identifies a type of redundant array of independent disks (RAID) being used by the first storage volume.

9. The computer implemented method of claim 7, wherein the reliability score of the first storage volume is further based on storage characteristics of the first storage volume, the storage characteristics comprising a storage capacity, an amount of free storage, and a type of storage device.

10. The computer implemented method of claim 7, wherein the reliability score is a first reliability score, the method further comprising:
    determining a second reliability score of a second storage volume from the plurality of storage volumes, wherein the second storage volume is associated with a second server;
    communicating, to the user, the second reliability score of the second storage volume; and
    in response to the first reliability score being higher than the second reliability score, receiving, from the user, the selection of the first server that is associated with the first storage volume for execution of the task.

11. A system for selecting a server for executing a task, the system comprising:
    a memory; and
    a processor configured to:
        determine a plurality of storage volumes corresponding to respective servers from a plurality of servers;
        determine a reachability score of a first storage volume from the plurality of storage volumes, wherein the first storage volume is associated with a first server, and wherein the reachability score is indicative of a predetermined reliability, wherein the reachability score is further based on a channel type such that the reachability score assigned to the first volume is based on an average of reachability scores assigned to each of the different types of connectivity channels other than the first volume; and select the first server that is associated with the first storage volume for execution of the task.

12. The system of claim 11, wherein the reachability score of the first storage volume is further based on reliability scores of each connectivity channel from the connectivity channels associated with the first storage volume.

13. The system of claim 11, wherein the reachability score of the first storage volume is further based on a reachability score of the first server, wherein the reachability score of the first server is based on a number of hardware management consoles that have access to the first server.

14. The system of claim 11, wherein the reachability score is a first reachability score, and wherein the processor further configured to:

determine a second reachability score of a second storage volume from the plurality of storage volumes, wherein the second storage volume is associated with a second server;

communicate the second reachability score of the second storage volume; and in response to the first reachability score being higher than the second reachability score, receive the selection of the first server that is associated with the first storage volume for execution of the task.

15. The system of claim 11, wherein the processor further configured to:

receive a predetermined reachability threshold value; and in response to the reachability score of the first storage volume being lower than the predetermined reachability threshold value, notify a user.

16. The system of claim 11, wherein the processor further configured to:

determine a reliability score of the first storage volume based on the reachability score of the first storage volume and a storage-configuration score of the first storage volume, wherein the storage-configuration score is based on a type of configuration used by the first storage volume;

communicate the reliability score of the first storage volume to a user; and receive the selection of the first server for execution of the task.

17. A computer program product for selecting a server for executing a task, the computer program product comprising a computer-readable storage medium, the computer-readable storage medium comprising computer executable instructions, wherein the computer readable storage medium comprises instructions to:

determine a plurality of storage volumes corresponding to respective servers from a plurality of servers;

determine a reachability score of a first storage volume from the plurality of storage volumes, wherein the first storage volume is associated with a first server, and wherein the reachability score is indicative of a predetermined wherein the reachability score is further based on a channel type such that the reachability score assigned to the first volume is based on an average of reachability scores assigned to each of the different types of connectivity channels other than the first volume; and select the first server that is associated with the first storage volume for execution of the task.

18. The computer program product of claim 17, wherein the reachability score of the first storage volume is further based on reliability scores of each connectivity channel from the connectivity channels associated with the first storage volume.

19. The computer program product of claim 17, wherein the reachability score of the first storage volume is further based on a reachability score of the first server, wherein the reachability score of the first server is based on a number of hardware management consoles that have access to the first server.

20. The computer program product of claim 17, wherein the reachability score is a first reachability score, and wherein the computer readable storage medium further comprises instructions to:

determine a second reachability score of a second storage volume from the plurality of storage volumes, wherein the second storage volume is associated with a second server;

communicate the second reachability score of the second storage volume; and in response to the first reachability score being higher than the second reachability score, receive the selection of the first server that is associated with the first storage volume for execution of the task.

* * * * *